Sept. 17, 1935.    E. G. LUNN    2,014,390

BATTERY

Filed Nov. 14, 1933

INVENTOR
E.G. LUNN
BY Harold Dodd
ATTORNEY

Patented Sept. 17, 1935

2,014,390

UNITED STATES PATENT OFFICE 2,014,390

BATTERY

Edward G. Lunn, Washington, D. C.

Application November 14, 1933, Serial No. 697,921

2 Claims. (Cl. 136—19)

(Granted under the act of March 3, 1883, as amended April 30, 1928; 370 O. G. 757)

This invention relates to a battery, and has for an object to provide an improved battery of the lead-acid pasted-plate type whose life will be greatly increased over the life of batteries of the present known type. It is well known in the storage battery art that one of the causes for the short life of lead-acid pasted plate storage cells is the loss of active material from the plate due, in great part, to the paste material falling away from the plate, thus reducing the amount of available active material and accumulating at the bottom of the cell a mass of deposit which causes short circuits and local action. It is an object of this invention to eliminate separation of the paste material from the plate by positively holding the material in position in the plate without, however, interfering with its activity.

Although it is well known to provide slotted hard rubber separators to assist in the retention of the active material in the positive plate, this loss of material takes place nevertheless due to the buckling of the plates during use, and the separation of the plate from the separator allowing the active material to be lost therebetween. A further object of this invention is to prevent this separation of the slotted hard rubber separator from the pasted plate even though the plate may buckle to a considerable extent, the separator, according to this invention, remaining in intimate contact with the plate during buckling.

A further cause of the short life of storage cells of the lead-acid pasted plate type is due to the corrosion of the grid structure, the corrosion being due to chemical action between the lead in the grid structure and the sulphuric acid in the electrolyte, to the loss of antimony or other alloying and strengthening material from the lead plate or to any other causes which ultimately cause the plate to fall to pieces, causing failure of the cell. It is an object of this invention to prevent such corrosion by coating the free surfaces of the grid structure with rubber or other suitable corrosion resisting material thereby preventing contact of the grid structure with the electrolyte.

It is a further object of this invention to provide a storage battery cell using either or both features above described to thereby greatly lengthen the life of the plates and hence of the storage battery.

With the above and other objects in view, the invention consists in the construction, combination and arrangement of parts as will be hereinafter more fully described.

Reference is to be had to the accompanying drawing forming a part of this specification in which like reference characters indicate corresponding parts throughout the several views and in which.

Figure 1:
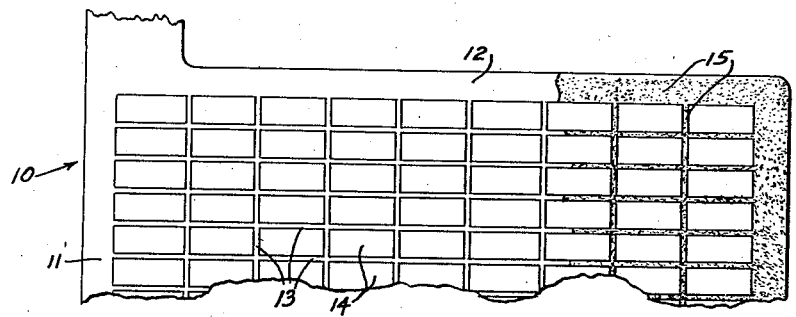
Fig. 1 is a plan view, partly broken away, of a lead-acid pasted-plate.
Figure 2:
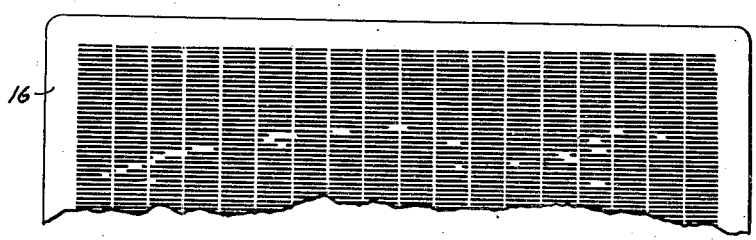
Fig. 2 is a plan view, partly broken away, of a flat slotted rubber separator.
Figure 3:
Fig. 3 is a top elevational view of the separator 10 of Fig. 2 applied to the plate of Fig. 1 according to this invention.

There is shown at 10 a positive plate of the lead-acid pasted-plate type for use in a storage battery, the plate 10 having edges 11 and 12 and 20 the grids 13 separating the active material-receiving spaces 14. The surface of the grids 13 is in the same plane with the edges 11 and 12. When the plate 10 is placed into use the spaces 14 will be completely filled with the active material of the positive plate while the edges 11 and 12 and the grids 13 are generally uncovered and hence exposed to the electrolyte. The plate 10 is generally made of lead and may contain antimony or other alloying material to strengthen the 30 same, and the effect of the electrolyte is to ultimately remove these alloying materials and weaken the plate until it falls to pieces, thus shortening the life of the battery.

According to one part of this invention all of 35 these exposed surfaces of the plate 10, as the edges 11 and 12 and the grids 13, are covered with a corrosion-resisting material as shown at 15. This corrosion-resisting material is preferably a rubber coating or other suitable material which 40 will prevent access of the electrolyte to the exposed surfaces of the plate. A rubber coating may be applied to the surface by electrodeposition of rubber from rubber latex solutions or by well known commercial processes of forming adherent 45 rubber coatings on metal surfaces such as the Covulc rubber process, the Goodrich Vulcalock process, which include cementing rubber to the metal with thermoprene cement and then vulcanizing the rubber to the metal, or any other 50 suitable processes. By thus coating the exposed surfaces of the plate 10 with corrosion-resisting material, the plate is saved from attack by the electrolyte and the strength thereof remains unimpaired.

Figure 4:
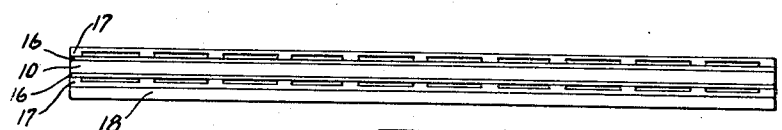
Fig. 4 is a top elevational view of this invention incorporated in one form of a storage cell.
Figure 5:
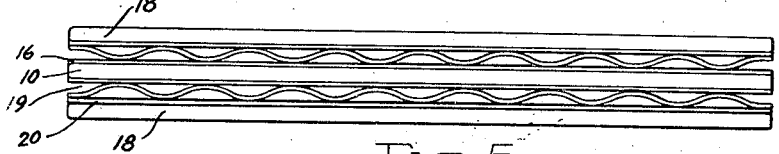
Fig. 5 is a top elevational view of this invention incorporated in another form of storage cell.

In building up a battery cell the positive plate 10 has placed next thereto a flat separator 16 which is preferably of slotted hard rubber. The separator, however, may likewise be a flat porous ebonite separator, a flat porous soft rubber separator, a hard rubber separator with perforations instead of slots, a soft rubber separator with slots or any other well known and suitable separator. Next to the separator 16 are placed two wooden separators 17 and next to each wooden separator 17 is placed the negative plate 18. Instead of a wooden separator 17 as shown in Fig. 4, a wavy slotted or perforated separator 19 may be used in combination with the thin wooden separator 20 as shown in Fig. 5.

According to this invention, instead of merely placing the separator 16 against the plate 10 in the conventional manner, the separator 16 is cemented to the plate 10 either along the four edges 11 and 12 or along the edges 11 and 12 and each of the grids 13. Any suitable type of cement for joining rubber to metal may be used which is not affected by the presence of the electrolyte. One type of cement found suitable for this purpose is that which is technically known as thermoprene cement.

According to the preferred form of this invention, the separator 16 is cemented to the plate 10 after the corrosion-resisting coating 15 has been placed thereon, but it will be obvious that the feature of cementing the separator to the edges and the grids of the plate may be used in the absence of the corrosion-resisting coating, and further that the corrosion-resisting coating may be used in the absence of cementing the separator to the plate.

It will be understood that the above description and accompanying drawings comprehend only the general and preferred embodiment of my invention and that various changes in construction, proportion and arrangement of parts may be made within the scope of the appended claims without sacrificing any of the advantages of my invention.

The invention described herein may be manufactured and used by or for the Government of the United States of America for governmental purposes without the payment of any royalties thereon or therefor.

I claim:

1. A storage battery unit comprising a plate of the lead-acid pasted plate type having exposed edges, corrosion-resisting means applied to said exposed edges, a flexible rubber separator, and thermoprene cement means intimately securing said separator to the corrosion-resisting means on said exposed edges.

2. A storage battery unit comprising a plate of the lead-acid pasted plate type having exposed edges and exposed separating grids between the active material, a corrosion-resisting rubber coating intimately secured on said exposed edges and said exposed grids, a flexible rubber separator, and thermoprene cement means intimately securing said separator to the corrosion-resisting rubber coating on said exposed edges and grids.

EDWARD G. LUNN.